US012657032B2

(12) United States Patent
  Dickens et al.

(10) Patent No.:    US 12,657,032 B2
(45) Date of Patent:    Jun. 16, 2026

(54) STORAGE SIDE IDENTIFICATION OF STORAGE AREA NETWORK BOOT LOGICAL UNIT NUMBERS

(71) Applicant: INTERNATIONAL BUSINESS MACHINES CORPORATION, Armonk, NY (US)

(72) Inventors: Louie A. Dickens, Vernon, AZ (US); Tara Astigarraga, Fairport, NY (US); Maunik Patel, Tucson, AZ (US); Jimmy Pazhoor John, Cary, NC (US); Kieron Dirk Anthony Hinds, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 18/662,459

(22) Filed: May 13, 2024

(65)             Prior Publication Data

US 2025/0348322 A1      Nov. 13, 2025

(51) Int. Cl.
  *G06F 15/00*      (2006.01)
  *G06F 9/4401*      (2018.01)
  *G06F 15/177*      (2006.01)
(52) U.S. Cl.
  CPC .......... *G06F 9/4401* (2013.01); *G06F 9/4406* (2013.01); *G06F 15/177* (2013.01)
(58) Field of Classification Search
  CPC .................................................... G06F 9/4401
  USPC .......................................................... 713/2
  See application file for complete search history.

(56)             References Cited

U.S. PATENT DOCUMENTS

| | | | | |
|---|---|---|---|---|
| 7,328,260 B1 * | 2/2008 | Muthiyan | ........... | H04L 41/0681 711/170 |
| 8,060,587 B2 * | 11/2011 | Ahmad | .................... | H04L 41/06 709/227 |
| 10,038,596 B2 | 7/2018 | Nema | | |
| 10,282,211 B2 | 5/2019 | Parmar | | |
| 11,789,651 B2 | 10/2023 | Pabón et al. | | |
| 2002/0156984 A1 * | 10/2002 | Padovano | ............. | G06F 11/201 711/148 |
| 2003/0179227 A1 * | 9/2003 | Ahmad | ............... | H04L 67/1097 715/736 |
| 2006/0047852 A1 * | 3/2006 | Shah | ...................... | G06F 9/4405 709/245 |
| 2007/0192466 A1 * | 8/2007 | Nahum | ................. | G06F 9/4416 709/223 |

(Continued)

OTHER PUBLICATIONS

Dickens, et al., "Identification and Management of Remote Boot Operating Systems", U.S. Appl. No. 18/741,589, filed Jun. 12, 2024, 62 Pages.

*Primary Examiner* — Volvick Derose
(74) *Attorney, Agent, or Firm* — KONRAD, RAYNES, DAVDA & VICTOR LLP; Rabindranath Dutta

(57)             ABSTRACT

Provided are a method, system, and computer program product in which operations are performed to establish communication with a plurality of hosts that are coupled to a plurality of storage devices over a storage area network (SAN). Further operations are performed to discover and report those hosts of the plurality of hosts that are currently or have previously been SAN booted to one or more logical unit numbers (LUNs) within one or more storage devices of the plurality of storage devices.

15 Claims, 7 Drawing Sheets

(56) References Cited

U.S. PATENT DOCUMENTS

| | | | |
|---|---|---|---|
| 2013/0339600 A1* | 12/2013 | Shah ...................... | G06F 3/0656 |
| | | | 711/170 |
| 2016/0087843 A1* | 3/2016 | Nema ................. | H04L 41/0895 |
| | | | 709/220 |
| 2016/0203000 A1* | 7/2016 | Parmar ................... | H04L 67/34 |
| | | | 713/2 |
| 2016/0299767 A1* | 10/2016 | Mukadam ............. | G06F 13/426 |
| 2018/0260569 A1* | 9/2018 | Sutton ..................... | H04L 63/18 |
| 2019/0340459 A1 | 11/2019 | Faibish | |
| 2022/0070190 A1* | 3/2022 | Giterman ........... | G06F 13/4221 |

* cited by examiner

1200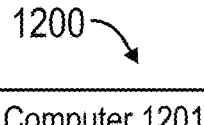

Computer 1201

Processor Set 1210

| Processing Circuitry 1220 | Cache 1221 |
| --- | --- |

Communication Fabric 1211

Volatile Memory 1212

Persistent Storage 1213

Operating System 1222

SAN Boot LUN
Identification
Application
1260

1250

Peripheral Device Set 1214

| UI Device Set 1223 | Storage 1224 | IoT Sensor Set 1225 |
| --- | --- | --- |

Network Module 1215

WAN 1202

End User Device 1203

Remote Server 1204

Remote Database 1230

Private Cloud 1206

Gateway 1240

Public Cloud 1205

Cloud Orchestration Module 1241

Host Physical Machine Set 1242

Virtual Machine Set 1243

Container Set 1244

FIG. 7

STORAGE SIDE IDENTIFICATION OF STORAGE AREA NETWORK BOOT LOGICAL UNIT NUMBERS

BACKGROUND

Embodiments relate to a method, system, and computer program product for storage side identification of storage area network (SAN) boot logical unit numbers (LUNs).

A Storage Area Network (SAN) is a specialized network that provides hosts with network access to storage devices. SANs are typically composed of hosts, switches and storage devices that are interconnected using a variety of technologies in a plurality of topologies and protocols. SANs may span multiple sites and communication over the SANs may take place in a plurality of protocols.

A SAN presents storage devices to a host, such that the storage appears to be locally attached to the host. This may be accomplished via different types of virtualization mechanisms. A logical unit number (LUN) is a unique identifier that defines a storage partition in a SAN environment for data organization and access, and hosts access data stored in LUNs. A LUN is a component in storage organization but is not a type of storage device itself.

Booting servers such as hosts from a SAN are used in data center environments, due to benefits over booting from local disks. SAN boot enables organizations to consolidate information technology resources and reduce equipment costs. SAN boots also simplify server management by centralizing the boot process.

In SAN boot, a system administrator may deploy diskless servers in a computing environment where the boot disk is located on storage connected to the SAN. In many situations the storage comprises Redundant Array of Independent Disks (RAID) arrays. The server communicates with the storage device through the SAN using a Fibre Channel host bus adapter (HBA) or some other type of adapter. The operating system boot image for a server may be stored in one or more LUNs and may be used for booting the server during a SAN boot.

SUMMARY

Provided are a method, system, and computer program product in which operations are performed to establish communication with a plurality of hosts that are coupled to a plurality of storage devices over a storage area network (SAN). Further operations are performed to discover and report those hosts of the plurality of hosts that are currently or have previously been storage area network (SAN) booted to one or more logical unit numbers (LUNs) within one or more storage devices of the plurality of storage devices.

In additional embodiments, operations to discover LUNs by transmitting a plurality of different protocol commands to the one or more storage devices and subsequently comparing responses against known protocol results fingerprints are performed.

In yet additional embodiments, operations are performed to create historical host operating system and LUN SAN boot relationships by using known data patterns in data, known protocol commands, and various protocol required notifications for detecting changes that are consistent with operating system shutdowns, reimages and host to LUN relationship changes.

In further embodiments, in response to detecting a relationship change, operations are performed to compare the relationship change to known fingerprints.

In yet further embodiments, the operations further comprise: in response to determining that a new protocol fingerprint is not a known fingerprint, performing: determining what changed by issuing a plurality of known protocol specific commands for each of a plurality of known protocols and then comparing command results against known protocol fingerprints; and in response to determining that the new protocol fingerprint matches a known protocol fingerprint, the plurality of known protocol specific commands are issued to obtain a host operating system and LUN SAN boot relationships.

In certain embodiments, in response to determining that no known protocol fingerprint can be found to match, a training process is performed to generate a new protocol fingerprint.

In further embodiments, storage side identification of SAN boot LUNs is performed.

BRIEF DESCRIPTION OF THE DRAWINGS

Referring now to the drawings in which like reference numbers represent corresponding parts throughout:

FIG. 7 illustrates a computing environment in which certain components may be implemented, in accordance with certain embodiments.

DETAILED DESCRIPTION

Figure 1:
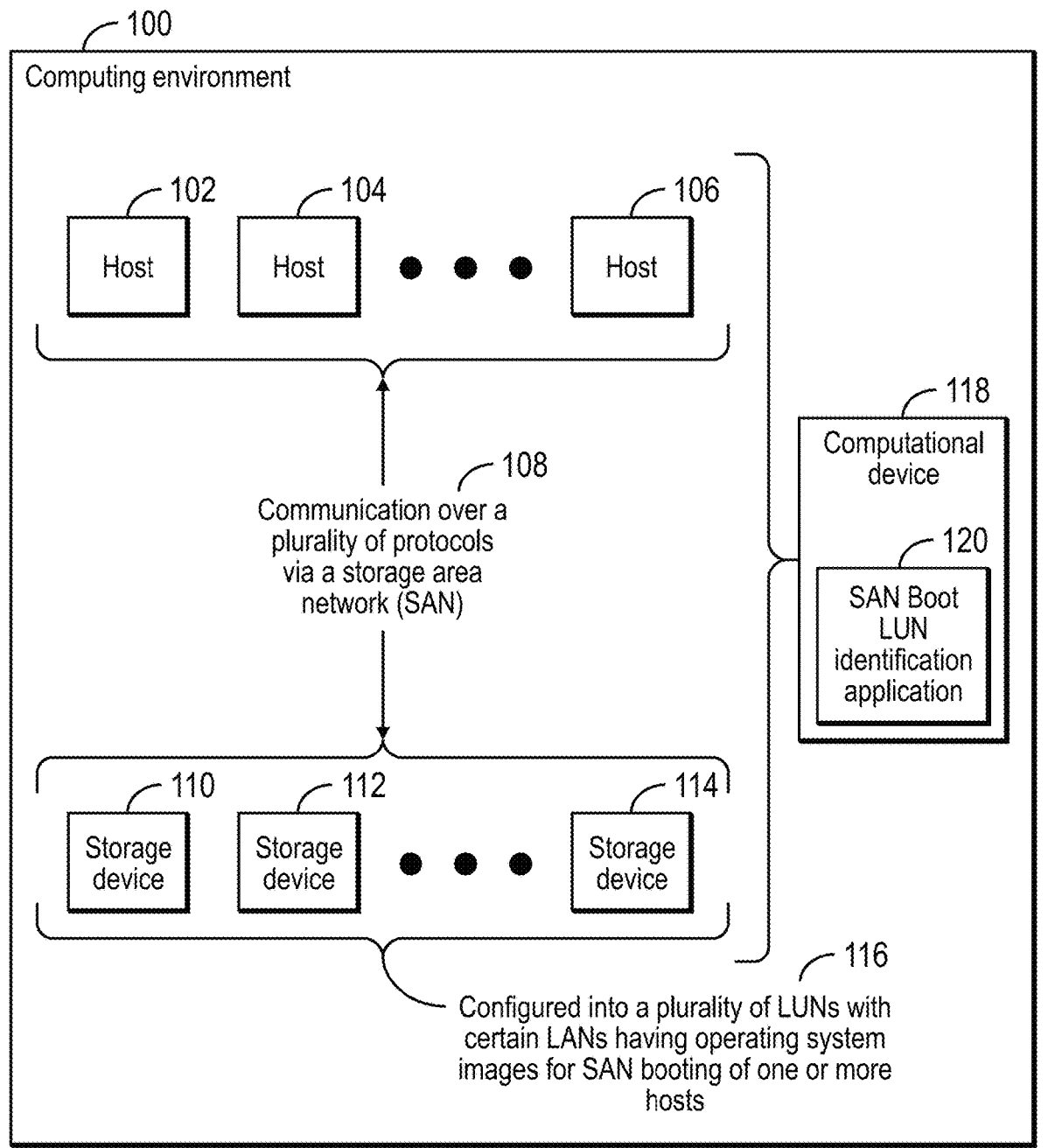
FIG. 1 illustrates a block diagram of a computing environment, in accordance with certain embodiments.

In the following description, reference is made to the accompanying drawings which form a part hereof and which illustrate several embodiments. It is understood that other embodiments may be utilized and structural and operational changes may be made.

SAN booting an operating system has become an increasingly popular alternative to the traditional process of booting due to its many advantages. The advantages include less power consumption, less heat generation, less expensive servers, more efficient use of storage, high availability, rapid disaster recovery, centralized server management, superior performance, etc. The popularity of SAN booting combined with the frequent stream of updates and changes to the various operating systems have created significant problems for SAN administrators of medium-to-large installations.

Currently, there is no automated or time-efficient method for a SAN administrator to determine which hosts and related applications are SAN booted from a particular storage device and potentially from a given drive or drives. Having this information available becomes extremely important for a SAN administrator when they have to reboot, upgrade operating systems, or decommission storage.

Additionally, it is possible that one or more end users could have one or more applications that require the use of a different operating system on a particular storage device for a short period of time (e.g., one day). If a SAN administrator uses the manual SAN boot verification process via a login operation to each system or virtual environment, then this type of short transitory usage is likely to go undetected.

Certain embodiments use artificial intelligence or other techniques to detect known operating system patterns in real-time data from a specific storage location [e.g., a Logical block address (LBA) range] while the data is in flight. Once an operating system has been detected, the characteristics of the operating system along with the host information are then recorded. Over time, using such embodiments and a heuristic process, a total and complete storage device or logical unit (LUN) map is created and made available to a SAN administrator.

Currently there are various mechanisms to discover if an adapter is SAN booted via various commands, such as certain Fibre Channel commands, certain Linux commands, or via Power Shell or Visual Basic scripts in Windows Management implementations. Certain embodiments provide mechanisms for discovering and reporting all of the hosts that are currently or have been previously SAN booted to each of the various LUNS within one or more storage devices.

Currently there is no mechanism for obtaining any historical host to LUN SAN boot relationships. Historical information becomes important to know because it is possible that some hosts may be temporarily SAN booted to different operating systems for a short period of time. For example, a business may have an application that only runs on an old operating system, and that application is only used once a month to run a monthly report. In this case the host may be SAN booted to the old operating system for a matter of hours or days and then may be again SAN booted back to the newer operating system and the administrator may have no way of knowing about this temporary monthly requirement.

Certain embodiments support all of the currently known in the art storage protocols including but not limited to Non-Volatile Memory Express (NVMe), NVMe over Fabrics, Remote Direct Memory Access (RDMA) network protocols, Fibre Channel, Internet SCSI (Small Computer System Interface) [i.e., iSCSI], iSCSI Extensions for RDMA (iSER). Additionally, the system could be trained and configured to support any protocol including vendor property protocols.

As a result of certain embodiments presented in this disclosure, improvements are made to a computational device by providing mechanisms for storage side identification of storage area network boot LUNs. The embodiments use both static and long-term heuristics for discovering and detecting SAN booted hosts, and use training processes to augment the discovery and detection of the SAN booted hosts.

FIG. 1 illustrates a block diagram of a computing environment 100, in accordance with certain embodiments.

A plurality of hosts 102, 104, 106 are in communication over a plurality of protocols via a SAN (as shown via reference numeral 108) to a plurality of storage devices 110, 112, 114. The hosts 102, 104, 106 comprise computational devices that may access data stored in the storage devices 110, 112, 114, where SAN booting may be performed of one or more hosts from LUNs that represent data stored in the storage devices 110, 112, 114.

The plurality of storage devices 110, 112, 114 are configured into a plurality of LUNs with certain LANs having operating system images for SAN booting of one or more hosts (as shown via reference numeral 116).

A computation device 118 that executes a SAN boot LUN identification application 120 is maintained in the computing environment 100. The SAN boot LUN identification application 120 determines which hosts have been SAN booted from operating system images of which LUNs historically over a period of time as well as currently.

The hosts 102, 104, 106 and the computational device 118 may in certain embodiments comprise any suitable computational device known in the art such as a server, a personal computer, a laptop, a telephony device, a mainframe, etc. The SAN boot LUN identification application 120 may be implemented in software, hardware, firmware, or any combination thereof.

Figure 2:
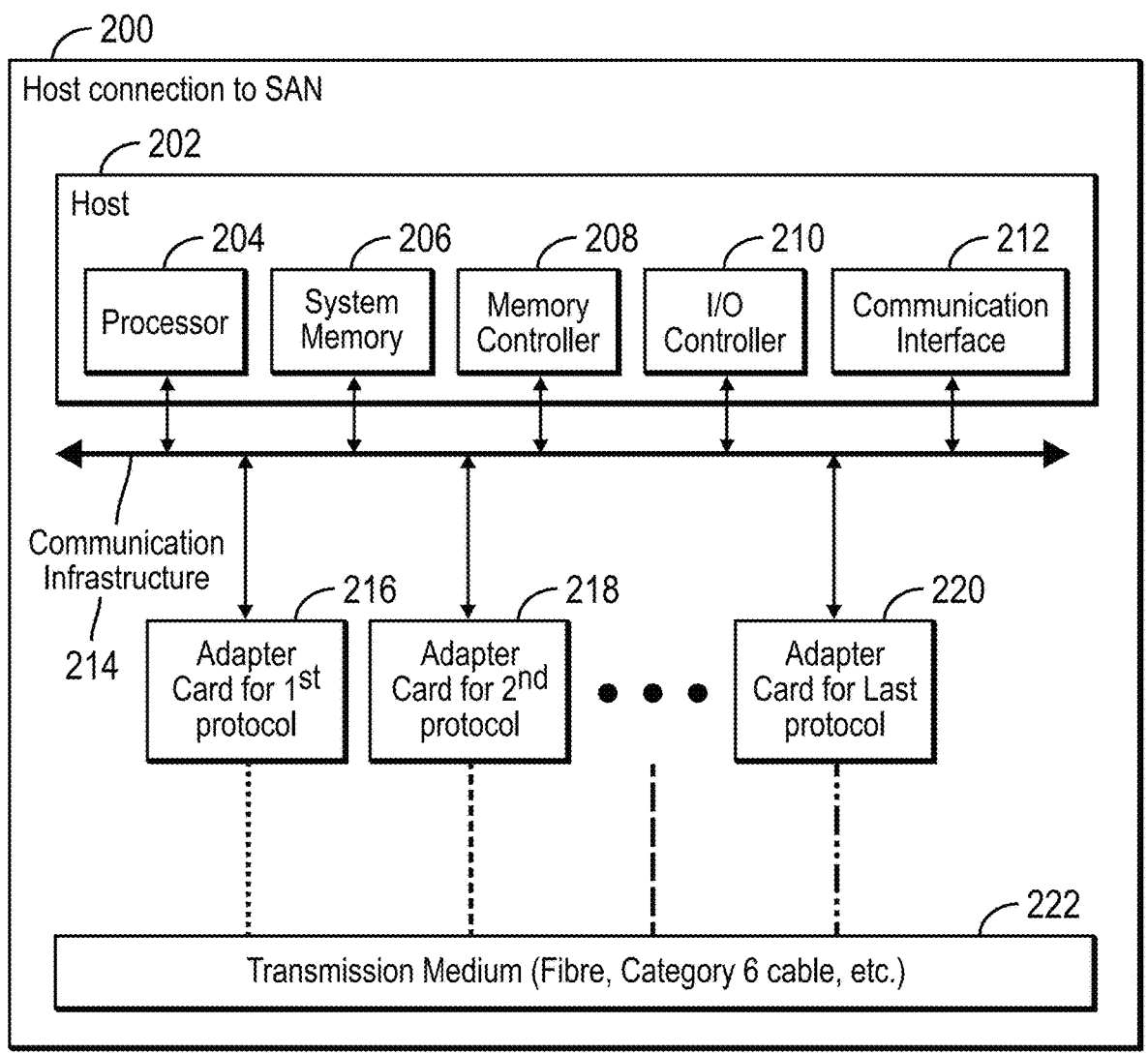
FIG. 2 illustrates a block diagram that illustrates a host connection to a SAN, in accordance with certain embodiments.

FIG. 2 illustrates a block diagram 200 that illustrates a host connection to a SAN, in accordance with certain embodiments.

A host 202 that may comprise any of the plurality of hosts 102, 104, 106 is shown in FIG. 2. The host includes a processor 204, a system memory 206, a memory controller 208, an input/output (I/O) controller 210, and a communication interface 212.

The host is coupled over a communications infrastructure 214 and a plurality of adapter cards 216, 218, 220 to a transmission medium 222 for connection to a SAN via which images stored in LUNs are used to SAN boot the host. Each adapter card of the plurality of adapter cards 216, 218, 220 may support communication via a specific protocol. The transmission medium 222 may be a fibre, a category 6 cable, or some other type of transmission medium.

Certain embodiments use two mechanisms (static and long-term heuristics) for discovering and detecting SAN booted host.

In static discovery of all LUNs, the initial discover process may in certain embodiments enable the sending of multiple different protocol commands to a storage device and then comparing the responses against known protocol results fingerprints. Whenever there is a match to a known protocol fingerprint, the host/LUN information is recorded along with other pertinent information such as the protocol being used, the operating system being SAN booted, and the host identification [i.e., Internet Protocol (IP) address, Nport name, Nport identifier (ID), alias, etc.].

In long term heuristics operations, after the initial discovery process completes and all of the host/LUN relationships have been recorded then the creation of a historical host operating system/LUN SAN boot relationship determination process starts. This process uses known data patterns in the data, known protocol commands, and various other protocols, various protocol required notifications for detecting changes that are consistent with operating system shutdowns, reimages and host/logical unit relationship changes.

Whenever a relationship change is detected an artificial intelligence-based mechanism examines the change and compares it against known fingerprints. If the protocol fingerprint is a known fingerprint, then the new host operating system/LUN SAN boot relationships are recorded. Otherwise, it is necessary to performed the following operations:

(a) Determine what changed: In order to determine what changed it may be necessary to issue 1 to N known protocol commands for each of the known protocols and then compare the commands results against known protocol fingerprints.

(b) Fingerprint match: Anytime the new protocol fingerprint matches a known protocol fingerprint then 1 to N protocol specific commands are issued to obtain the host operating system/LUN SAN boot relationships. Once this information has been obtained it is then recorded.

(c) Match not found: If no known protocol fingerprint is found then it may become necessary to perform an artificial intelligence training process so that a new protocol fingerprint can be created.

Once the system has tried and failed to find a match with all of its known protocol fingerprints then it begins a training process to train the system's artificial intelligence process for the unknown protocol.

The method for inputting the training data is inconsequential and could be any of the following: a text document, a graphical user interface (GUI), etc. What is important for the training process is to match the protocol specific commands with the training template. For example, the system could have a high-level process called get all available logical units. The process for getting logical units varies from protocol to protocol. For some protocols like Small Computer System Interface (SCSI) this process involves issuing five SCSI commands, but for other protocols like Fibre Channel NVMe (FCNVMe) it will require issuing many different commands using multiple different protocols.

Figure 3:
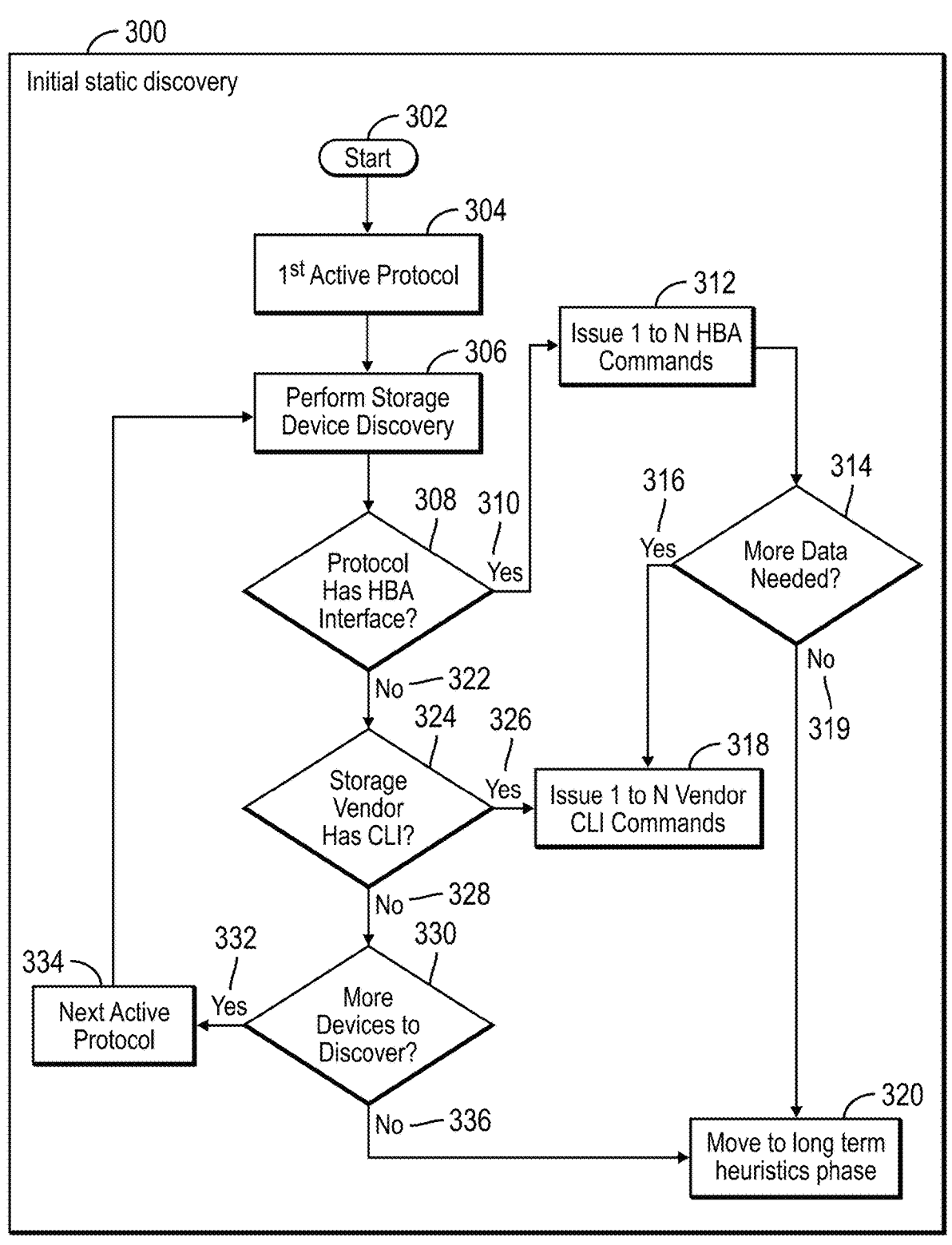
FIG. 3 illustrates a flowchart that shows an initial static discovery of all LUNs, in accordance with certain embodiments.

FIG. 3 illustrates a flowchart 300 that shows an initial static discovery of all LUNs, in accordance with certain embodiments.

Control starts at block 302 and proceeds to block 304 in which the first active protocol is used to perform (at block 306) storage device discovery. Control proceeds to block 308 where a determination is made as to whether the protocol has a host bus adapter (HBA) interface associated with it. If so, ("Yes" branch 310) control proceeds to block 312 in which 1 to N (N being a natural number) host bus adapter (HBA) commands are issued.

From block 312 control proceeds to block 314 in which a determination is made as to whether more data is needed. If so ("Yes" branch 316) then 1 to N vendor Command Line Interface (CLI) commands are issued (at block 318). If not ("No" branch 319), then the process moves to a long-term heuristics phase to be described in FIG. 4 (at block 320).

If at block 308 it is determined that the protocol does not have an HBA interface ("No" branch 322) then control proceeds to block 324 where it is determined if the storage vendor has CLI. If so ("Yes" branch 326), control proceeds to block 318 where 1 to N CLI commands are issued. If not ("No" branch 328), a determination is made (at block 330) as to whether there are more devices to discover. If so ("Yes" branch 332) then the next active protocol is considered (at block 334) and control returns to block 306. If not ("No" branch 336) then control proceeds to block 320 where the process moves to the long-term heuristics phase to be described in FIG. 4.

Figure 4:
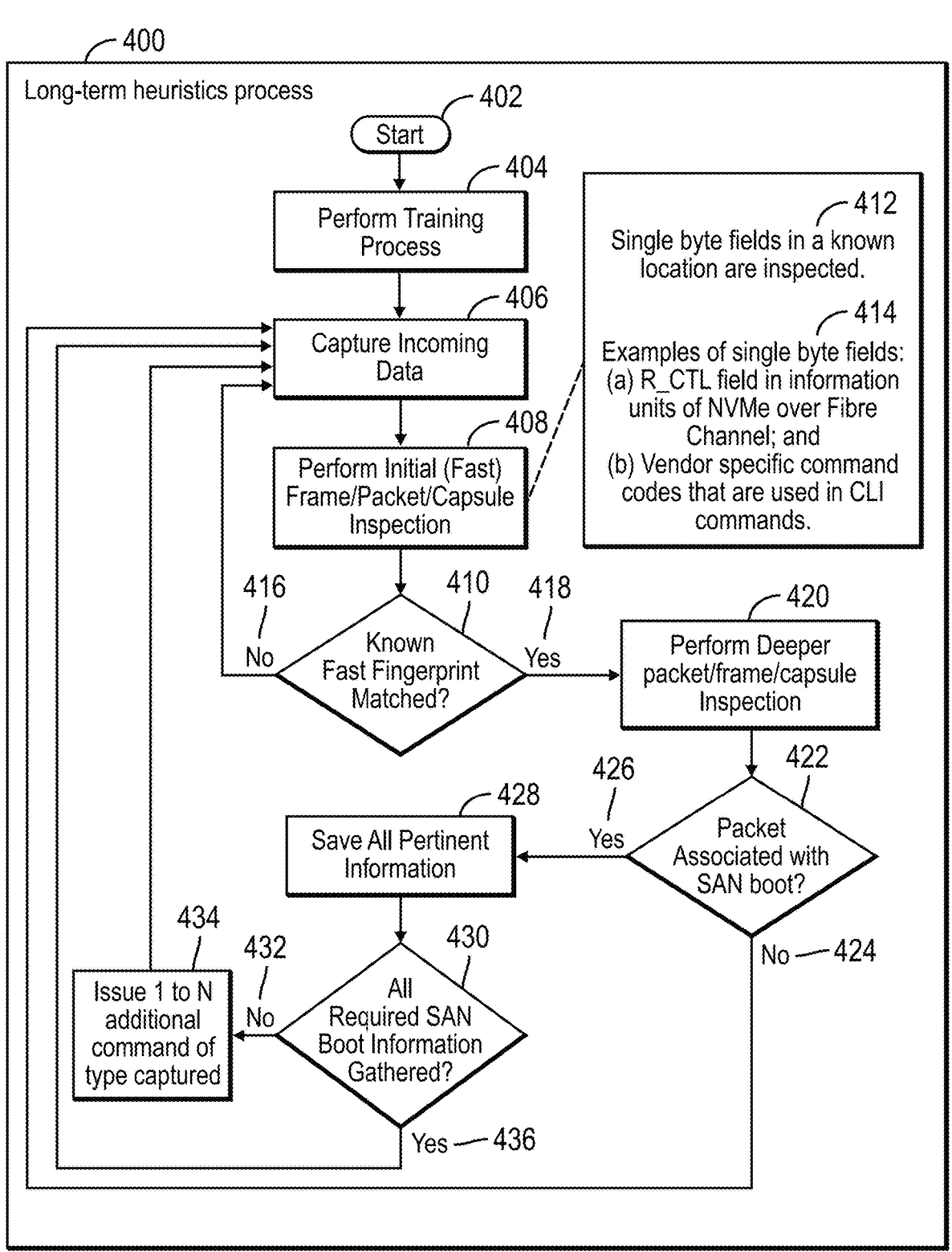
FIG. 4 illustrates a flowchart that shows a long-term heuristics process, in accordance with certain embodiments.

FIG. 4 illustrates a flowchart 400 that shows a long-term heuristics process, in accordance with certain embodiments.

Control starts (at block 404), and a training process is performed (at block 404). Incoming data is captured (at block 406) and an initial frame (or packet or capsule) inspection is performed (at block 408), and then control proceeds to block 410. To perform the initial frame inspection in an expeditious manner single byte fields in a known location may be examined (as shown via reference numeral 412). Examples of single byte fields that are inspected include (a) R_CTL field in information units of NVMe over Fibre Channel; and (b) Vendor specific command codes that are used in CLI commands (as shown via reference numeral 414).

At block 410 it is determined whether the last known fingerprint matched, and if not ("No" branch 416) control returns to block 406 to capture further incoming data. Otherwise ("Yes" branch 418) control proceeds to block 420 where a deeper inspection of packets (or frames or capsules) is performed. Control proceeds to block 422 from block 410, and at block 422 it is determined whether a packet is associated with SAN boot and if not ("No" branch 424) control returns to block 406 to capture further incoming data. Otherwise ("Yes" branch 426) control proceeds to block 428 where all pertinent information is saved.

From block 428 control proceeds to block 430 in which it is determined whether all required SAN boot information has been gathered, and if not ("No" branch 432) control proceeds block 434 where the process issues 1 to N additional command of type captured and control returns to block 406 to capture additional incoming data. Otherwise ("Yes" branch 436) control returns to block 406 to capture additional incoming data.

Figure 5:
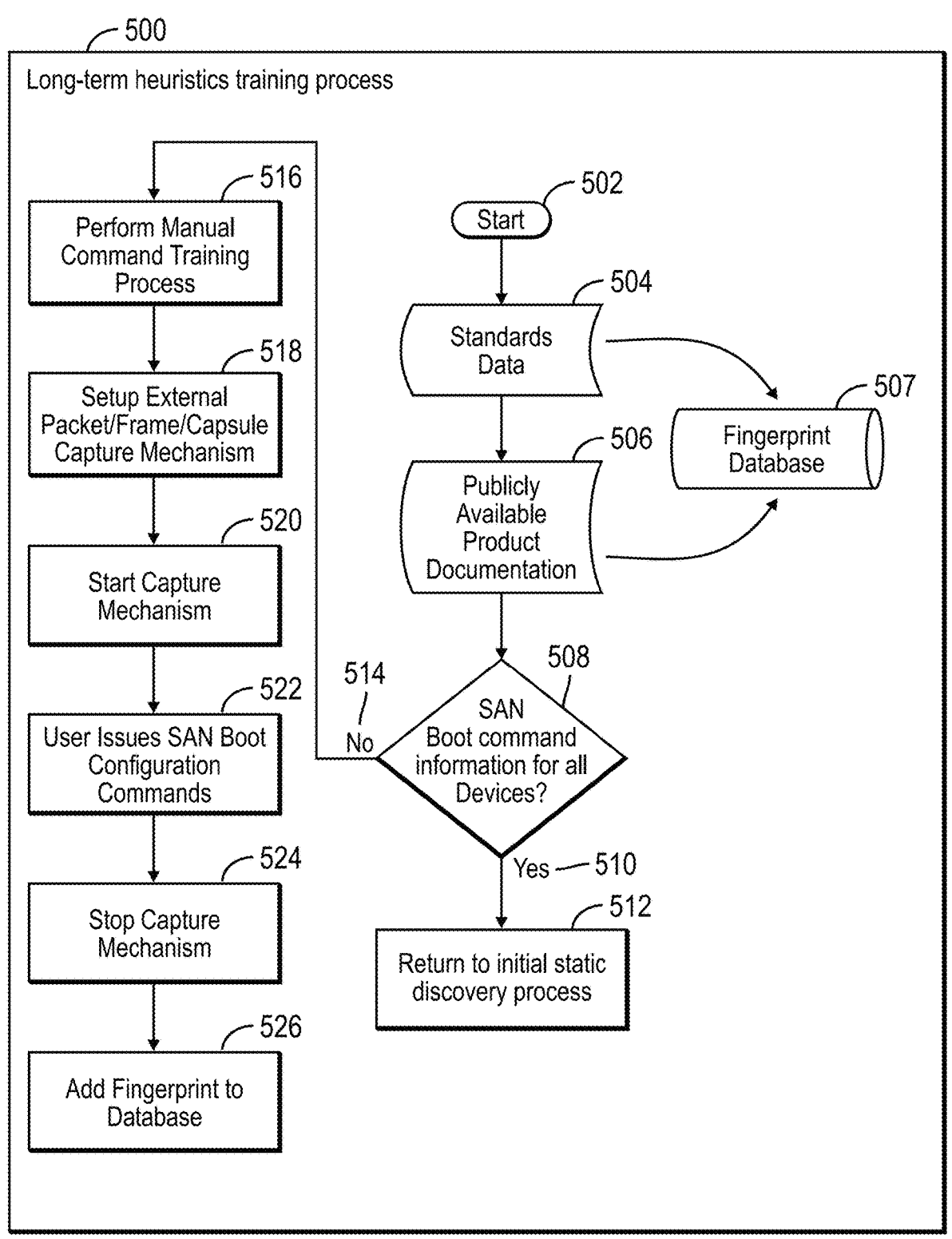
FIG. 5 illustrates a flowchart that shows a long-term heuristics training process, in accordance with certain embodiments.

FIG. 5 illustrates a flowchart 500 that shows a long-term heuristics training process, in accordance with certain embodiments.

Control starts at block 502 and standards data 504 (e.g., standards data of professional organizations) and publicly available product documentation 506 in conjunction with a fingerprint database 507 are used for training, and then control proceeds to block 508 in which it is determined whether SAN boot command information is now available for all devices. If so ("Yes" branch 510), control returns (at block 512) to the initial static discovery process shown in FIG. 3.

If at block 508 it is determined that the SAN boot command information is not known for all device ("No" branch 514) then control proceeds to block 516 in which a manual command training process is performed. Control proceeds to block 518 in which an external packet (or frame or capsule) capture mechanism is set up, and a capture mechanism is started (at block 520). Then the user issues (at block 522) SAN boot configuration commands and the capture mechanism is stopped (at block 524) to add the fingerprint to the database (at block 526).

Figure 6:
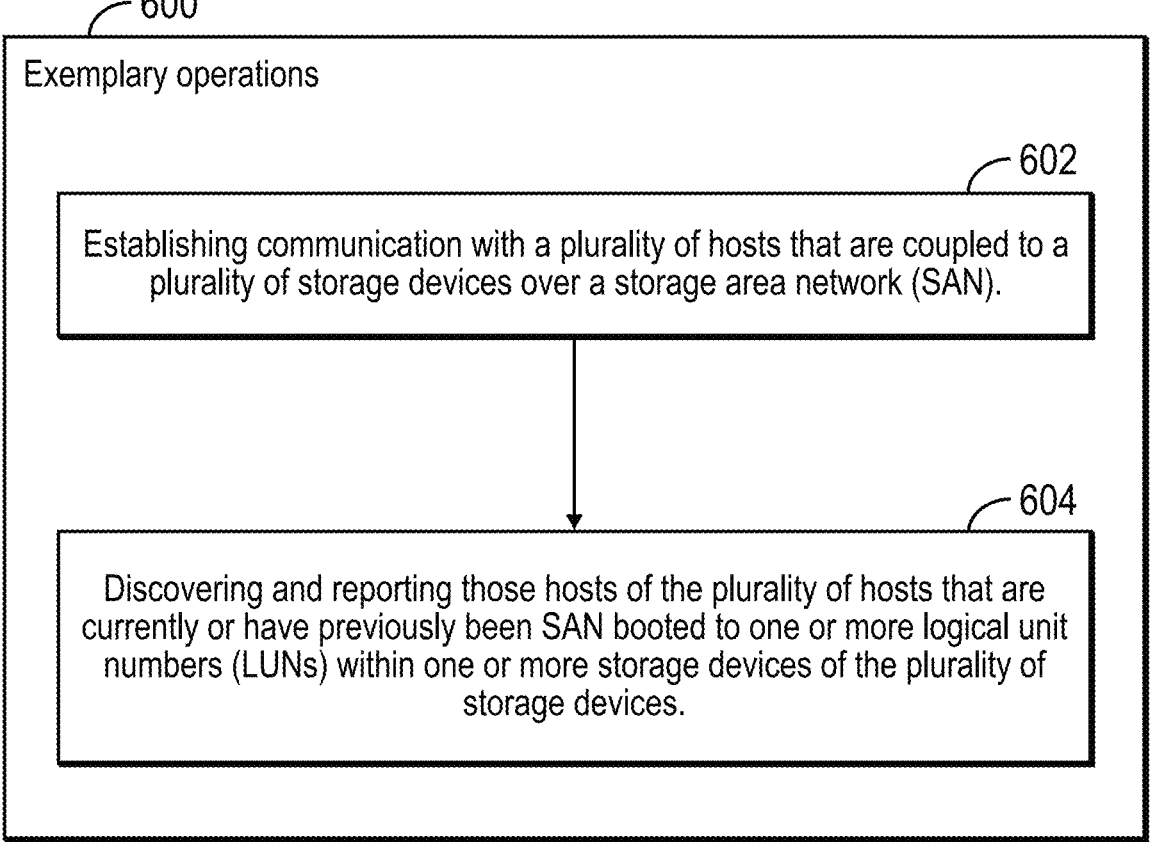
FIG. 6 illustrates a flowchart that shows exemplary operations for storage side identification of SAN boot LUNs, in accordance with certain embodiments.

FIG. 6 illustrates a flowchart 600 that shows exemplary operations for storage side identification of SAN boot LUNs, in accordance with certain embodiments.

Control starts at block 602 in which the SAN boot LUN identification application 120 establishes communication with a plurality of hosts 102, 104, 106 that are coupled to a plurality of storage devices 110, 112, 114 over a storage area network (SAN).

From block 602 control proceeds to block 604 in which the SAN boot LUN identification application 120 discovers and reports those hosts of the plurality of hosts that are currently or have previously been SAN booted to one or more logical unit numbers (LUNs) within one or more storage devices of the plurality of storage devices.

Therefore, FIGS. 1-6 illustrate embodiments for determining historical SAN booting patterns of hosts, and the host to LAN relationships used in SAN booting of hosts to prevent accidental deletions and erroneous cleanups.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

In FIG. 7, computing environment 1200 contains an example of an environment for the execution of at least some of the computer code (block 1250) involved in performing the SAN boot LUN identification application 1260 that performs operations shown in FIGS. 1-6.

In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. I/O T sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
establishing communication with a plurality of hosts that are coupled to a plurality of storage devices over a storage area network (SAN);
discovering and reporting those hosts of the plurality of hosts that are currently or have previously been SAN booted to one or more logical unit numbers (LUNs) within one or more storage devices of the plurality of storage devices;
discovering LUNs by transmitting a plurality of different protocol commands to the one or more storage devices and subsequently comparing responses against known protocol results fingerprints; and
creating historical host operating system and LUN SAN boot relationships by using known data patterns in data, known protocol commands, and various protocol required notifications for detecting changes that are consistent with operating system shutdowns, reimages and host to LUN relationship changes.

2. The method of claim 1, the method further comprising:
in response to detecting a relationship change, comparing the relationship change to known fingerprints.

3. The method of claim 2, the method further comprising:
in response to determining that a new protocol fingerprint is not a known fingerprint, performing:
determining what changed by issuing a plurality of known protocol specific commands for each of a plurality of known protocols and then comparing command results against known protocol fingerprints; and
in response to determining that the new protocol fingerprint matches a known protocol fingerprint then the plurality of known protocol specific commands are issued to obtain a host operating system and LUN SAN boot relationships.

4. The method of claim 3, the method further comprising:
in response to determining that no known protocol fingerprint can be found to match, performing a training process to generate a new protocol fingerprint.

5. The method of claim 1, wherein storage side identification of SAN boot LUNs is performed.

6. A system, comprising:
a memory; and
a processor coupled to the memory, wherein the processor performs operations, the operations comprising:
establishing communication with a plurality of hosts that are coupled to a plurality of storage devices over a storage area network (SAN);

discovering and reporting those hosts of the plurality of hosts that are currently or have previously been SAN booted to one or more logical unit numbers (LUNs) within one or more storage devices of the plurality of storage devices;

discovering LUNs by transmitting a plurality of different protocol commands to the one or more storage devices and subsequently comparing responses against known protocol results fingerprints; and creating historical host operating system and LUN SAN boot relationships by using known data patterns in data, known protocol commands, and various protocol required notifications for detecting changes that are consistent with operating system shutdowns, reimages and host to LUN relationship changes.

7. The system of claim 6, the operations further comprising:

in response to detecting a relationship change, comparing the relationship change to known fingerprints.

8. The system of claim 7, the operations further comprising:

in response to determining that a new protocol fingerprint is not a known fingerprint, performing:

determining what changed by issuing a plurality of known protocol specific commands for each of a plurality of known protocols and then comparing command results against known protocol fingerprints; and in response to determining that the new protocol fingerprint matches a known protocol fingerprint then the plurality of known protocol specific commands are issued to obtain a host operating system and LUN SAN boot relationships.

9. The system of claim 8, the operations further comprising:

in response to determining that no known protocol fingerprint can be found to match, performing a training process to generate a new protocol fingerprint.

10. The system of claim 6, wherein storage side identification of SAN boot LUNs is performed.

11. A computer program product comprising a computer readable storage medium having computer readable program code embodied therewith, the computer readable program code when executed is configured to perform operations, the operations comprising:

establishing communication with a plurality of hosts that are coupled to a plurality of storage devices over a storage area network (SAN);

discovering and reporting those hosts of the plurality of hosts that are currently or have previously been SAN booted to one or more logical unit numbers (LUNs) within one or more storage devices of the plurality of storage devices;

discovering LUNs by transmitting a plurality of different protocol commands to the one or more storage devices and subsequently comparing responses against known protocol results fingerprints; and creating historical host operating system and LUN SAN boot relationships by using known data patterns in data, known protocol commands, and various protocol required notifications for detecting changes that are consistent with operating system shutdowns, reimages and host to LUN relationship changes.

12. The computer program product of claim 11, the operations further comprising:

in response to detecting a relationship change, comparing the relationship change to known fingerprints.

13. The computer program product of claim 12, the operations further comprising:

in response to determining that a new protocol fingerprint is not a known fingerprint, performing:

determining what changed by issuing a plurality of known protocol specific commands for each of a plurality of known protocols and then comparing command results against known protocol fingerprints; and in response to determining that the new protocol fingerprint matches a known protocol fingerprint then the plurality of known protocol specific commands are issued to obtain a host operating system and LUN SAN boot relationships.

14. The computer program product of claim 13, the operations further comprising:

in response to determining that no known protocol fingerprint can be found to match, performing a training process to generate a new protocol fingerprint.

15. The system of claim 11, wherein storage side identification of SAN boot LUNs is performed.

* * * * *